United States Patent [19]

Hara et al.

[11] Patent Number: 4,587,180
[45] Date of Patent: May 6, 1986

[54] NON-AQUEOUS CELL HAVING CONNECTING TABS

[75] Inventors: Mitsunori Hara; Yukiteru Yoshihira; Toshiro Furuhashi, all of Sumoto, Japan

[73] Assignee: Sanyo Electric Co., Ltd., Osaka, Japan

[21] Appl. No.: 345,398

[22] Filed: Feb. 3, 1982

[30] Foreign Application Priority Data

Feb. 10, 1981 [JP] Japan .............................. 56-17371[U]
Feb. 20, 1981 [JP] Japan .............................. 56-23778[U]
Feb. 24, 1981 [JP] Japan .............................. 56-25355[U]

[51] Int. Cl.$^4$ ............................................. H01M 14/00
[52] U.S. Cl. ...................................... 429/8; 429/120; 429/194
[58] Field of Search ................ 429/120, 8, 194–197, 429/101–105

[56] References Cited

U.S. PATENT DOCUMENTS

| | | | |
|---|---|---|---|
| 4,292,380 | 9/1981 | O'Boyle et al. | 429/101 |
| 4,307,509 | 12/1981 | McLean et al. | 429/101 X |
| 4,352,867 | 10/1982 | Catanzarite | 429/101 |
| 4,360,574 | 11/1982 | Park | 429/103 X |

*Primary Examiner*—Charles F. LeFevour
*Attorney, Agent, or Firm*—Stiefel, Gross, Kurland & Pavane

[57] ABSTRACT

A non-aqueous cell of the type having a negative electrode of a light metal such as lithium or sodium pressure bonded either directly or through the medium of a negative-electrode current collector to the inner surface of a negative terminal case, which non-aqueous cell has means for buffering heat transfer disposed inside said negative terminal case and allows a connecting tab to be bonded by welding at one end thereof to the outer surface of said negative terminal case at the position opposite that of said means for buffering heat transfer.

8 Claims, 5 Drawing Figures

NON-AQUEOUS CELL HAVING CONNECTING TABS

BACKGROUND OF THE INVENTION

This invention relates to a non-aqueous cell of the type using a light metal such as lithium or sodium as the substance for a negative active material.

The cells of this type, owing to the advantage of their high voltage and high energy density, have come to be used as power sources for electronic calculators and electronic watches in the place of silver cells and mercury cells. More recently, they are being adopted as power sources for memories in electronic circuits, particularly as memory backup power sources which are expected to serve during power failure. In this case, the cells are used in the structural system that they will be incorporated into printed-circuit boards similarly to other electronic components. It is, therefore, necessary that connecting tabs should be bonded one each to the positive and negative terminal cases which serve concurrently as positive and negative terminals. Cells of the type of construction described above have been disclosed as by U.S. Pat. No. 4,247,603; Japanese Unexamined Utility Model Publication No. 159,521/1978, for example.

Particularly in the case of non-aqueous cells such as button type non-aqueous cells which are constructed so that negative electrode is pressure-bonded either directly or through the medium of negative-electrode current collector of good thermal conductivity to the inner surface of negative terminal case, when the connecting tab is welded at one end thereof the outer surface of the negative terminal case by the series spot method or the indirect spot method, for example, the portion being welded is heated to temperatures as high as 1000° C. The intense heat, therefore, melts the negative electrode of low melting points (180° C. for lithium and 98° C. for sodium) and consequently melts the separators keeping the positive and negative electrodes apart, with the unfavorable result that the cells suffer occurrence of internal short circuits.

With reference to occurence of deteriorating state of affairs mentioned above, this invention is aimed at preventing the welding of a connecting tab from exerting a thermal effect upon the negative electrode of the cell.

SUMMARY OF THE INVENTION

An object of this invention is to provide a non-aqueous cell of the type having a negative electrode of a light metal such as lithium or sodium pressure-bonded either directly or through the medium of a negative-electrode current collector to the inner surface of a negative terminal case, which non-aqueous cell has means for buffering heat transfer disposed inside said negative terminal case and allows a connecting tab to be bonded by welding at one end thereof to the outer surface of said negative terminal case at the position opposite that of said means for buffering heat transfer. The expression "means for buffering heat transfer" as used herein refers to a means which buffers possible heat transfer to the negative electrode within the negative terminal case, of the heat applied during the welding of the connecting tab at one end thereof to the outer surface of the negative terminal case. This means is disposed inside the negative terminal case at the position opposite the position on the outer surface of the negative terminal case at which one end of the connecting tab is welded. To be specific, this means is a heat insulating member bonded to the inner surface of the negative terminal case; a heat insulating member disposed along the inner surface of the negative terminal case or along the surface of the negative electrode on which the negative electrode is pressure-bonded through the medium of a negative-electrode current collector to the inner surface of the negative terminal case; or a buffer void formed at a part between the negative terminal case and the negative electrode, for example, a hole or recess formed in the negative electrode.

Since the non-aqueous cell of this invention is provided with such means for buffering heat transfer as described above, possible melting of the negative electrode and consequently possible melting of the separator by the heat applied during the welding of the connecting tab to the outer surface of the negative terminal case and further possible occurrence of a short circuit due to the melting of the separator are prevented.

The construction and the advantage of this invention will become apparent from the further disclosure of the invention to be made herein below with reference to the accompanying drawings.

DETAILED DESCRIPTION OF THE PREFERRED EMBODIMENT

Now, the present invention will be described below with reference to the acompanying drawings.

Figure 1:
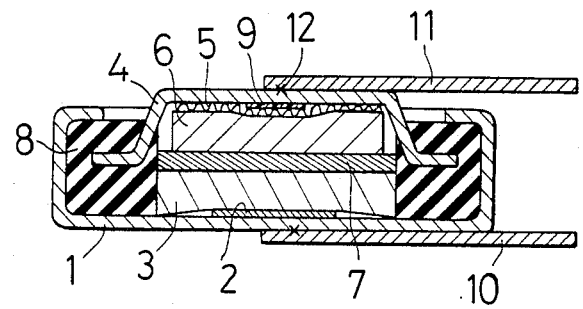
FIG. 1, FIG. 3 and FIG. 4 are sectioned views of non-aqueous cells representing varying embodiments of this invention.

FIG. 1 illustrates one preferred embodiment of the non-aqueous cell of this invention. By (1) is denoted a positive terminal case made of stainless steel. On the inner bottom of this positive terminal case is provided a positive electrode (3) using manganese dioxide, for example, as its active material and secured in position through the medium of a positive-electrode current collector (2). Denoted by (4) is a negative terminal case made of stainless steel. On the inner bottom of this negative terminal case, a negative-electrode current collector (5) made of stainless steel wire net is secured in position by spot welding. To this negative-electrode current collector (5), a negative-electrode (6) of a stated shape punched out of a rolled plate of lithium is pressure-bonded. By (7) is denoted a separator made of non-woven polypropylene fabric and impregnated with a stated amount of a non-aqueous electrolyte. (8) denotes an insulating packing which serves to insulate the positive terminal case and the negative terminal case between therefor.

Then, (9) denotes a heat insulating member disposed on one part of the inner surface of the aforementioned negative terminal case (4). It is formed by coating the one part of the inner surface of the negative terminal case with a layer of sillicone resin or pitch about 0.1 mm in thickness, for example. Optionally, a heat insulating resin member of a high melting point such as, for example, a non-woven fabric of polyethylene or polypropylene about 0.1 mm in thickness, may be interposed between the negative terminal case (4) and the negative-electrode current collector (5).

By (10) and (11) are denoted first and second connecting tabs which are bonded by spot welding respectively to the outer surfaces of the positive and negative terminal cases. They are each made of a nickel plate or nickel-plated iron plate. Particularly, the second connecting tab (11) has one end thereof bonded (12) by spot welding to the outer surface of the negative terminal case opposite the aforementioned heat insulating member (9).

Figure 2:
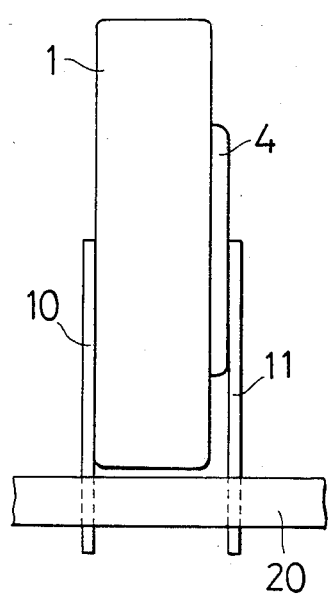
FIG. 2 is a side view of the non-aqueous cell of FIG. 1 as inserted in a printed-circuit board (20).

The cell of the present invention constructed as described above is incorporated in a printed-circuit board (20) by having the pair of connecting tabs (10), (11) inserted in the printed-circuit board (20) as illustrated in FIG. 2 and subsequently soldered thereto together with other parts.

In the non-aqueous cell described above, the heat insulating member is disposed on one part of the inner surface of the negative terminal case to which the negative electrode of a light metal such as lithium or sodium is pressure-bonded directly or through the medium of the negative-electrode current collector, and one end of the connecting tab is bonded by welding to the outer surface of the negative terminal case at the position opposite the heat insulating member. The thermal effect possibly exerted upon the negative electrode during the spot welding of the connecting tab is prevented by the heat insulating member. Consequently, the possible melting of the separator due to the melting of the negative electrode and the possible occurrence of a short circuit due to the melting of the separator are both precluded.

Figure 3:
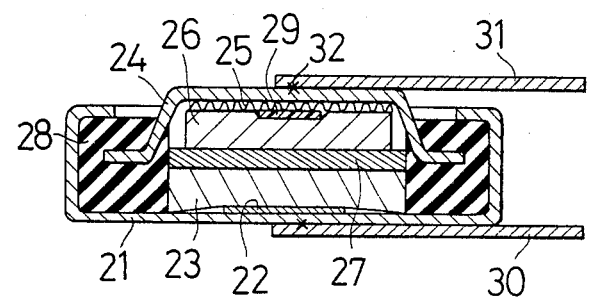

FIG. 3 illustrates another preferred embodiment of the non-aqueous cell of this invention. In this embodiment, the means for buffering heat transfer is a heat insulating member (29) which is disposed along one part of the surface of the negative electrode (26) contiguous to the negative-electrode current collector (25). This heat insulating member is formed of a polypropylene sheet or non-woven polypropylene fabric about 0.1 mm in thickness. The construction of this cell is similar to that of the preferred embodiment of FIG. 1 in all the other respects.

When the cell is devoid of the negative-electrode current collector (25), the heat insulating member (29) is disposed directly along the inner surface of the negative terminal case (24).

The present non-aqueous cell is also incorporated in the printed-circuit board in the same manner as illustrated in FIG. 2, i.e., by having the pair of connecting tabs (30), (31) inserted in the printed-circuit board and subsequently bonded thereto by soldering together with the other parts.

In the non-aqueous cell described above, the heat insulating member is disposed along one part of the surface of the negative electrode contiguous to the negative terminal case or the negative-electrode current collector, and one end of the connecting tab is bonded by welding to the outer surface of the negative terminal case opposite the heat insulating member. During the bonding of the connecting tab by spot welding, the thermal effect possibly exerted by the welding on the negative electrode is precluded because the heat insulating member intervenes between the negative electrode and the position opposite the point of spot welding. Consequently, the possible melting of the separator due to the melting of the negative electrode and the possible occurrence of a short circuit due to the melting of the separator are both precluded.

Figure 4:
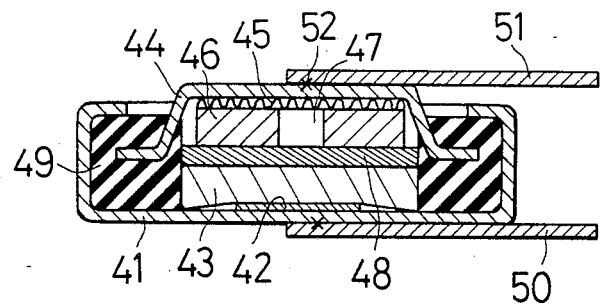

FIG. 4 illustrates yet another preferred embodiment of the non-aqueous cell of this invention. In this embodiment, the means for buffering heat transfer is a hole (47) formed in the negative electrode (46). The construction of this cell is identical with that of the embodiment of FIG. 1 in all the other respects.

Figure 5:
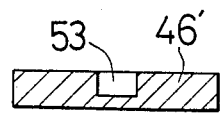
FIG. 5 is a sectioned view of a negative electrode provided with a recess as means for buffering heat transfer.

FIG. 5 illustrates another embodiment of the negative electrode (46'). In this embodiment, the means for buffering heat transfer is a recess (53) formed in the surface of the negative electrode contiguous to the negative-electrode current collector.

In any of the embodiments described above, because of the void formed at a part between the negative terminal case and the negative electrode, the heat applied during the welding of the connecting tab can be prevented from being transferred to the negative electrode. Consequently, the otherwise possible occurrence of a short circuit in the cell due to the melting of the separator which would result when the negative electrode was melted can be precluded.

The non-aqueous cell of the present embodiment can be incorporated in the printed-circuit board in the same manner as illustrated in FIG. 2, i.e. by having the pair of connecting tabs (50), (51) inserted into the printed-circuit board and subsequently bonded thereto by soldering together with the other parts.

Now, the heat insulating member which is used as means for buffering heat transfer in the non-aqueous cell of this invention will be described.

The three heat insulating members which are enumerated below are each a heat insulating layer to be formed and used on the inner surface of the negative terminal case at the position opposite the position at which the connecting tab is welded.

(i) Sillicone resin layer

This is formed by applying a solvent-less sillicone resin (about 70,000 cps of viscosity) in an amount such as to give a layer about 0.01 to 0.1 mm in dry thickness and allowing the applied resin to stand and cure at room temperature for 15 to 16 hours.

(ii) Epoxy resin layer

This is formed by applying a resin solution obtained by mixing a main epoxy resin component with a curing agent in an amount such as to give a layer about to 0.01 to 0.1 mm in dry thickness and keeping the applied resin at about 90° C. for about 30 minutes to cure.

(iii) Pitch layer

This is formed by dissolving pitch, which is a high molecular weight viscous substance of petroleum origin consisting preponderantly of asphalt, in xylene, applying the resultant solution in an amount such as to give a layer about 0.01 to 0.1 mm in dry thickness, and drying the applied layer at room temperature for 15 to 18 hours or at 60° C. for 4 to 6 hours.

The other heat insulating member, i.e., (iv) a sheet or non-woven fabric of such a synthetic resin as polyethylene, polypropylene, or polyester, where the negative electrode is directly pressure-bonded to the inner surface of the negative terminal case, is to be used as inserted therebetween. Where the negative electrode is pressure-bonded to the inner surface of the negative terminal case through the medium of the negative-electrode current collector, the heat insulating member is used as inserted between the negative electrode and the negative-electrode current collector or between the negative terminal case and the negative-electrode current collector. This heat insulating member melts but the negative electrode does not melt when the connecting tab is bonded by welding to the outer surface of the negative terminal case.

The thickness of the heat insulating member described above is about 0.02 to 0.15 mm. The area and the shape of the heat insulating member are not specifically defined. They are only required to be such that the heat applied during the welding of the connecting tab to the outer surface of the negative terminal case may be prevented from exerting an adverse effect on the negative electrode.

The non-aqueous cell of the present invention is manufactured as described below. The first step comprises preparatorily forming the heat insulating layer of (i), (ii), or (iii) described above on the inner surface of the negative terminal case and thereafter pressure-bonding the negative electrode directly to the inner surface of the negative terminal case or spot welding the negative-electrode current collector to the inner surface of the negative terminal case and then pressure-bonding the negative electrode through the medium of the negative-electrode current collector to the inner surface of the negative terminal case; preparatorily inserting the heat insulating member of (iv) described above between the inner surface of the negative terminal case and negative-electrode current collector and thereafter spot welding the aforementioned current collector to the inner surface of the negative terminal case and then pressure-bonding the negative electrode through the medium of the aforementioned current collector to the inner surface of the negative terminal case, or spot welding the aforementioned current collector to the inner surface of the negative terminal case and then pressure-bonding the negative electrode through the medium of the heat insulating member to the negative-electrode current collector, otherwise directly pressure-bonding the negative electrode through the medium of the aforementioned heat insulating member to the inner surface of the negative terminal case; or alternatively causing the negative electrode which is provided with the hole or recess as described above to be pressure-bonded directly or through the medium of the negative-electrode current collector to the inner surface of the negative terminal case.

The last step comprises combining what has been obtained in the first step with the positive electrode, the positive terminal case, the separator, the insulating packing, etc. thereby assembling the non-aqueous cell and spot welding the pair of connecting tabs one each at one end thereof to the outer surfaces of the negative terminal case and the positive terminal case.

As metals usable for the negative electrode in the non-aqueous cell of this invention, there may be cited lithium, sodium, aluminium, and magnesium for example. When any of these metals is pressure-bonded directly on the inner surface of the negative terminal case, it melts when the connecting tab is bonded by welding. As active materials usable of the positive electrode, there may be cited manganese dioxide, carbon fluoride, and silver chromate, for example.

As negative terminal cases usable for the non-aqueous cell of the present invention, there may be cited those made of stainless steel, for example. As positive terminal cases similarly usable, there may be cited those made of stainless steel, for example. As connecting tabs usable for the non-aqueous cell of the present invention, there may be cited those of nickel plate, and nickel-plated iron plate, for example.

As electrolytes usable for the non-aqueous cell of the present invention, there may be cited those obtained by dissolving lithium perchlorate, lithium borofluoride, and the like in organic solvents such as propylene carbonate, ethylene glycol dimethyl ether, and $\gamma$-butyrolactone, for example.

Separators usable herein are non-woven fabrics of polyethylene, polypropylene, polyester, and rayon fibers, for example. The non-aqueous cells to which the present invention is applicable are those constructed so that the negative electrode made of a light metal such as lithium or sodium is pressure-bonded either directly or through the medium of a negative-electrode current collector to the inner surface of the negative terminal case. They are not limited to those which use the aforementioned liquid electrolytes but embrace also those which use solid electrolytes.

What is claimed is:

1. A non-aqueous cell having a negative electrode of a light metal pressure-bonded either directly or through a medium of a negative-electrode current collector to the inner surface of a negative terminal case so as to maintain electrical contact between the negative electrode and the case, and a connecting tab bonded by welding at one end thereof to the outer surface of said negative terminal case, said non-aqueous cell having a means for buffering heat transfer disposed inside said negative terminal case allowing said connecting tab to be bonded by welding at one end thereof to the outer surface of said negative terminal case at the position opposite that of said means for buffering heat transfer.

2. The non-aqueous cell according to claim 1, wherein the means for buffering heat transfer is formed of a heat insulating member.

3. The non-aqueous cell according to claim 2, wherein the heat insulating member is bonded to the inner surface of the negative terminal case.

4. The non-aqueous cell according to claim 3, wherein, the heat insulating member is a silicone resin layer, an epoxy resin layer, or a pitch layer.

5. The non-aqueous cell according to claim 2, wherein the heat insulating member is disposed along the inner surface of the negative terminal case or along the open surface of the negative electrode pressure-bonded through the medium of a negative-electrode current collector to the inner surface of the negative terminal case.

6. The non-aqueous cell according to claim 5, wherein the heat insulating member is a non-woven fabric or sheet made of polyethylene, polypropylene, or polyester.

7. The non-aqueous cell according to claim 1, wherein the means for buffering heat transfer is a buffer void formed at a part between the negative terminal case and the negative electrode.

8. The non-aqueous cell according to claim 7, wherein the buffer void is a hole or recess formed in the negative electrode at the position opposite the position at which the connecting tab is bonded by welding to the outer surface of the negative terminal case.

* * * * *